United States Patent [19]
Yeh

[11] Patent Number: 5,626,387
[45] Date of Patent: May 6, 1997

[54] CUSHION WITH COOLING STUBS

[76] Inventor: Ching-Hsiu Yeh, No. 56, Lane 240, Li-Jen Rd., Ta-Li City, Taichung Hsien, Taiwan

[21] Appl. No.: 394,807

[22] Filed: Feb. 27, 1995

[51] Int. Cl.⁶ .................................................. A47C 7/72
[52] U.S. Cl. ........................... 297/180.14; 297/180.11; 297/180.12; 297/452.46
[58] Field of Search ........................ 297/180.14, 180.13, 297/180.11, 180.1, 452.21, 452.22, 452.23, 452.26, 452.41, 452.42, 452.43, 452.45, 463.2, DIG. 3, 452.46, 452.47; 5/468, 469, 453

[56] References Cited

U.S. PATENT DOCUMENTS

| | | | |
|---|---|---|---|
| 3,137,523 | 6/1964 | Karner | 297/180.13 |
| 3,757,356 | 9/1973 | Freeman | 5/469 X |
| 4,981,324 | 1/1991 | Law | 297/180.11 |
| 5,004,294 | 4/1991 | Lin | 297/180.13 X |
| 5,226,188 | 7/1993 | Liou | 5/468 X |

Primary Examiner—Milton Nelson, Jr.
Attorney, Agent, or Firm—Oblon, Spivak, McClelland, Maier & Neustadt, P.C.

[57] ABSTRACT

A cushion includes a resilient seat body having an upper surface formed with a central depression and an inner periphery which defines the central depression. A retaining member is disposed on the upper surface of the seat body in the depression and is retained therein by the inner periphery of the seat body. The retaining member is made of a flexible material and is formed with an array of positioning holes. A plurality of cylindrical cooling stubs are made of stone. Each of the cooling stubs has a lower portion received fittingly in a respective one of the positioning holes. A conduit unit is embedded in the seat body for permitting passage of a cooling medium therein for cooling the cylindrical cooling stubs.

4 Claims, 11 Drawing Sheets

CUSHION WITH COOLING STUBS

BACKGROUND OF THE INVENTION

1. Field of the Invention

This invention relates to a cushion, more particularly to a cushion which is provided with cooling stubs and which is easy to assemble.

2. Description of the Related Art

A conventional cushion usually includes a foam seat body. The conventional cushion is uncomfortable to use since it usually becomes warm after a period of use.

To solve the aforementioned drawback, it has been proposed to mount a plurality of cooling stubs on the seat body. Since the cooling stubs will form a plurality of gaps between the user and an upper surface of the seat body, the heat that is generated when the cushion is in use can be easily dissipated.

To mount the cooling stubs on the upper surface of the seat body, a piece of flannel cloth, which is used to cover the seat body, must be initially formed with a plurality of through-holes. The flannel cloth is then dampened to facilitate the extension of the cooling stubs through the through-holes. The flannel cloth is dried afterwards. Since drying the flannel cloth will cause the latter to shrink, disengagement of the cooling stubs from the through-holes is unlikely to occur. However, extending the cooling stubs through the through-holes is labor-intensive, thereby increasing the manufacturing cost. Furthermore, if the diameter of the through-holes is too small, it is difficult to extend the cooling stubs through the through-holes. On the other hand, if the diameter of the through-holes is too large, the cooling stubs may disengage easily the through-holes even after the flannel cloth has been dried. Moreover, shrinkage of the flannel cloth cannot be easily controlled, thereby inconveniencing the assembly of the cooling stubs on the seat body.

SUMMARY OF THE INVENTION

Therefore, the main objective of the present invention is to provide a cushion which has provisions for cooling a plurality of cooling stubs on a seat body thereof and which is easy to assemble.

According to the present invention, a cushion includes a resilient seat body having an upper surface formed with a central depression and an inner periphery which defines the central depression. A retaining member is disposed on the upper surface of the seat body in the depression and is retained therein by the inner periphery of the seat body. The retaining member is made of a flexible material and is formed with an array of positioning holes. A plurality of cylindrical cooling stubs are made of stone. Each of the cooling stubs has a lower portion fittingly received in a respective one of the positioning holes. A conduit unit is embedded in the seat body for permitting passage of a cooling medium therein for cooling the cooling stubs.

BRIEF DESCRIPTION OF THE DRAWINGS

Other features and advantages of the present invention will become apparent in the following detailed description of the preferred embodiment, with reference to the accompanying drawings, of which.

DESCRIPTION OF THE PREFERRED EMBODIMENT

Figure 1:
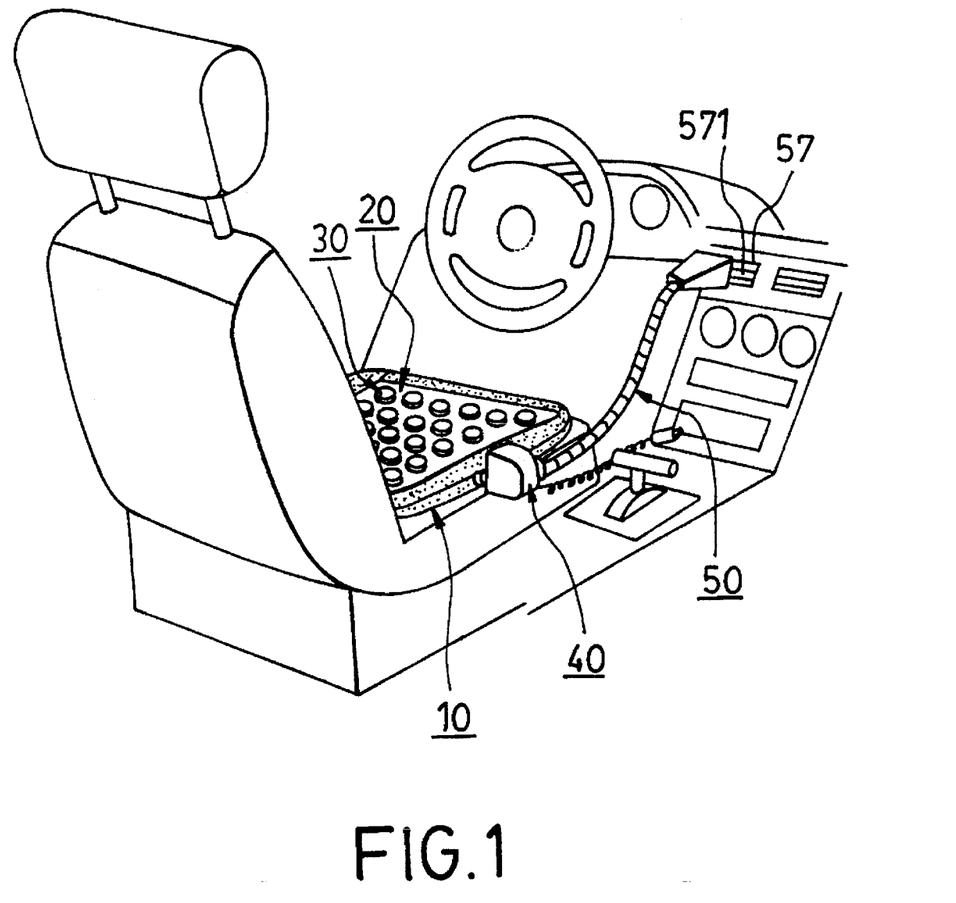
FIG. 1 is a perspective view illustrating a cushion according to a first embodiment of the present invention when used in an automobile.
Figure 2:
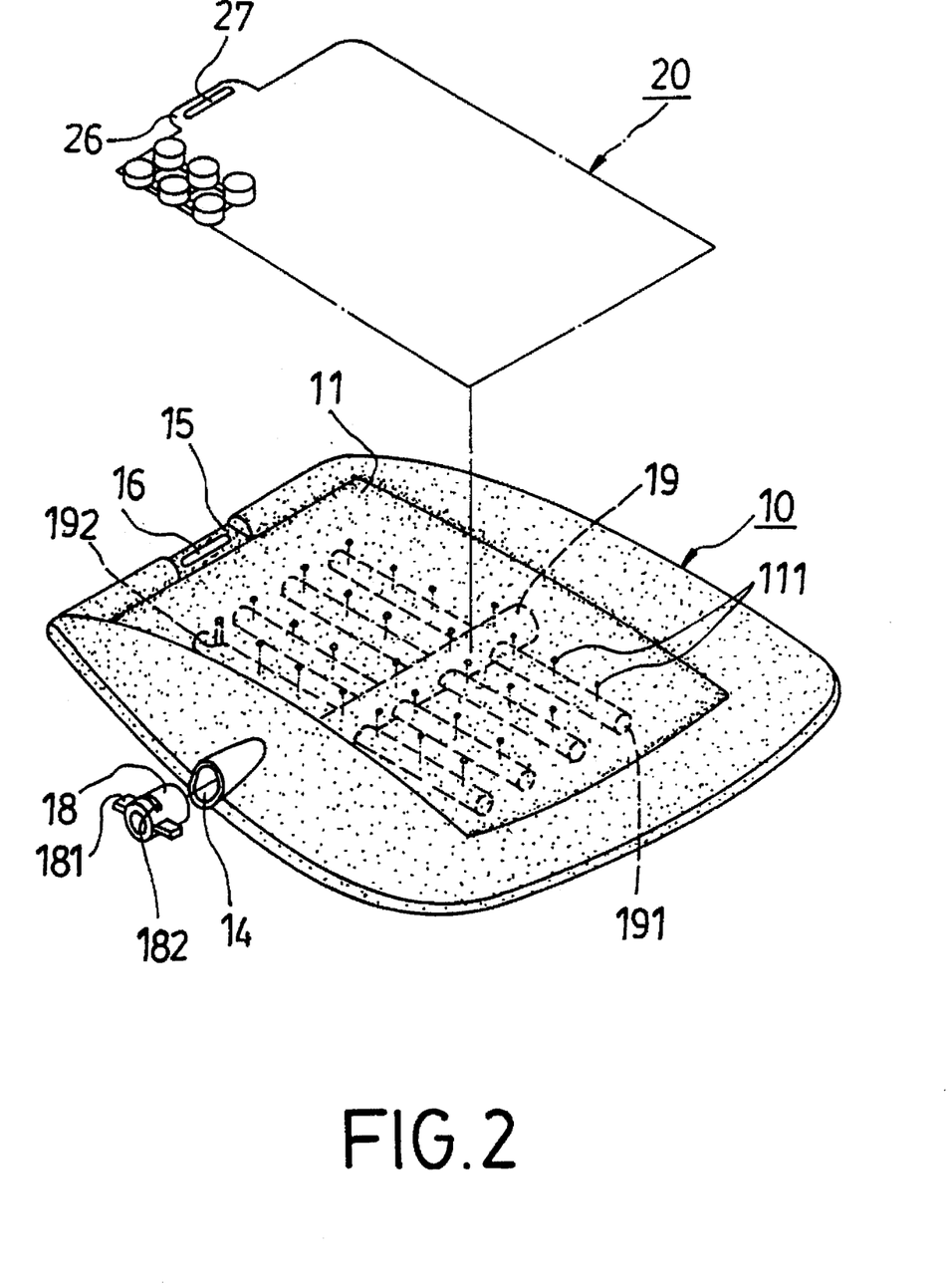
FIG. 2 is a partly exploded view showing the cushion according to the first embodiment of the present invention, an exhaust fan unit of the cushion being removed from the drawing.

Referring to FIGS. 1 and 2, a cushion according to the first embodiment of the present invention includes a resilient seat body 10, a retaining member 20, a plurality of cylindrical cooling stubs 30, a conduit unit 19 and an exhaust fan unit 40.

Figure 3:
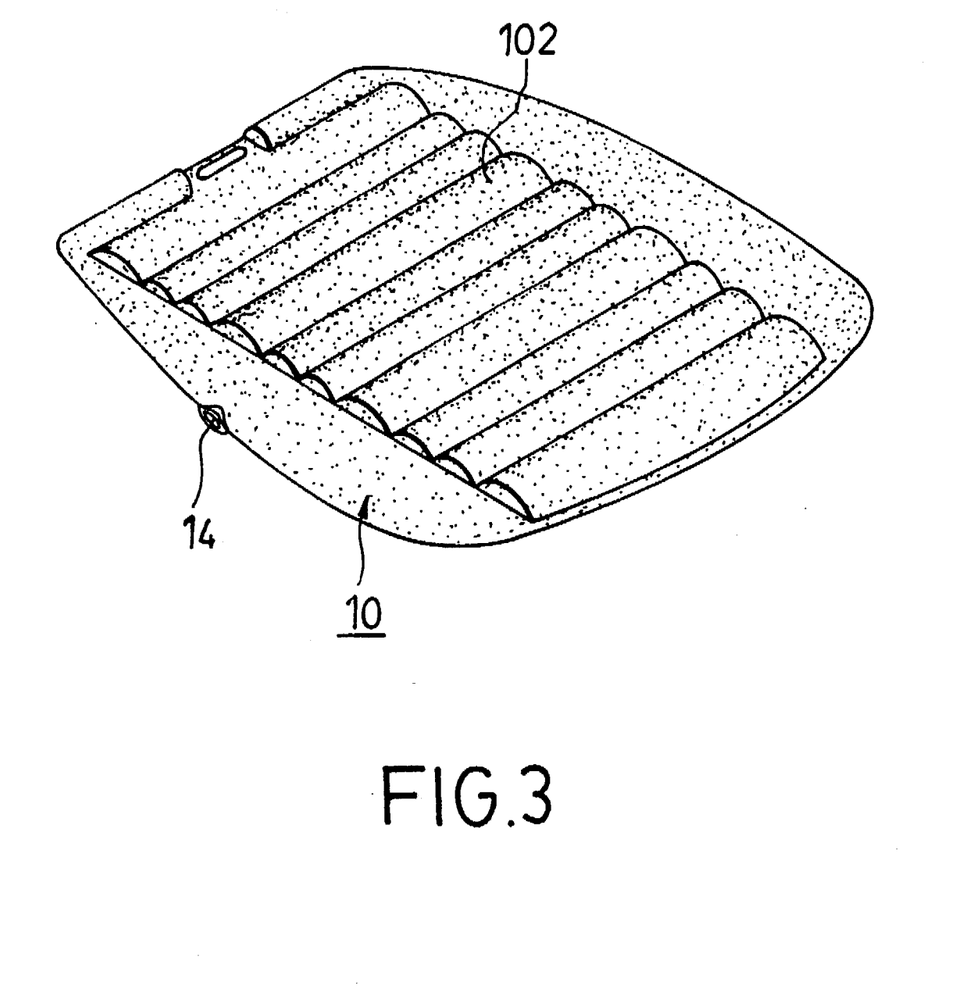
FIG. 3 is a bottom view of a resilient seat body of the cushion shown in FIG. 2.

Referring now to FIGS. 2 and 3, the resilient seat body 10 is made of foam and has an upper surface 11 which is formed with a central depression, an inner periphery which defines the central depression, and a wavy bottom surface 102 for preventing slipping of the cushion when the latter is in use. The seat body 10 further has an edge with a central section that has a flat surface 15 which is flush with a bottom of the depression and which is formed with an elongated slot 16. The upper surface 11 of the seat body 10 is formed with a plurality of vent holes 111 in the depression.

Figure 4:
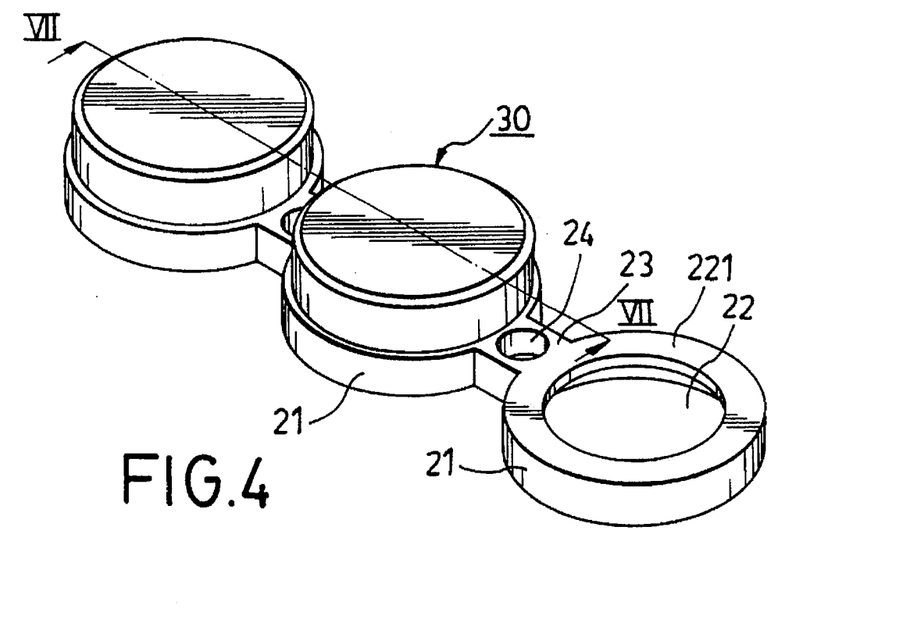
FIG. 4 is a perspective view showing a portion of a retaining member of the cushion shown in FIG. 2, the retaining member having cylindrical cooling stubs mounted thereon.
Figure 5:
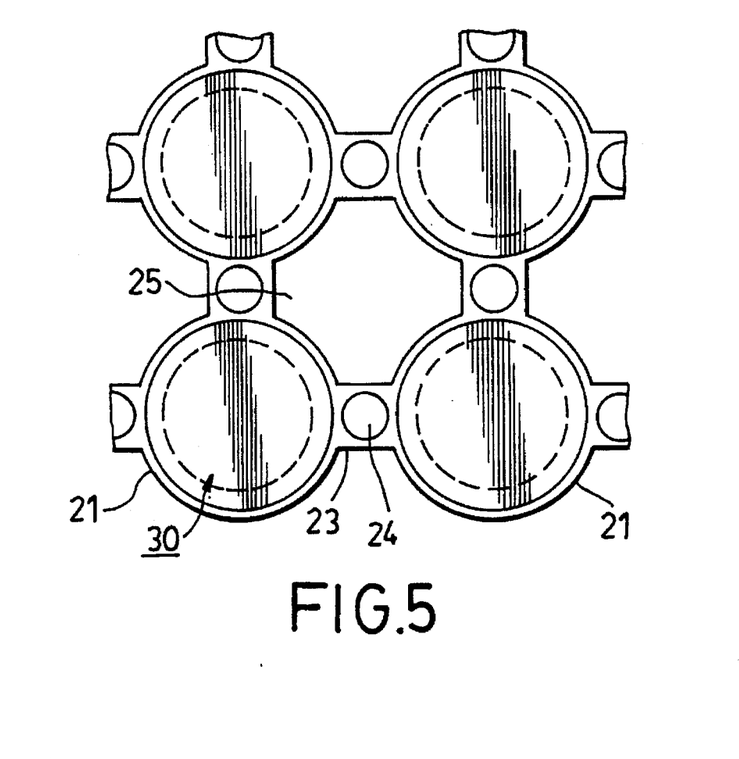
FIG. 5 is a plan view showing a portion of the retaining member of the cushion shown in FIG. 2, the retaining member having cylindrical cooling stubs mounted thereon.

Referring to FIGS. 2, 4 and 5, the retaining member 20 is disposed on the upper surface 11 of the seat body 10 in the depression and is retained therein by the inner periphery of the seat body 10. The retaining member 20 is made of a flexible material and is formed with an array of positioning holes 22. Each of the positioning holes 22 is defined by an annular wall 21 which has an upper end portion formed with an inwardly extending flange 221. Every two adjacent annular walls 21 are interconnected by a web 23 which is formed with a through-hole 24. Every four adjacent annular walls 21 and the corresponding webs 23 cooperatively define a space 25 thereamong. The retaining member 20 has a lug 26 which extends outwardly therefrom and over the flat surface 15 of the seat body 10. The lug 26 is formed with an elongated through-hole 27 which is aligned with the elongated slot 16 of the seat body 10.

Figure 6:
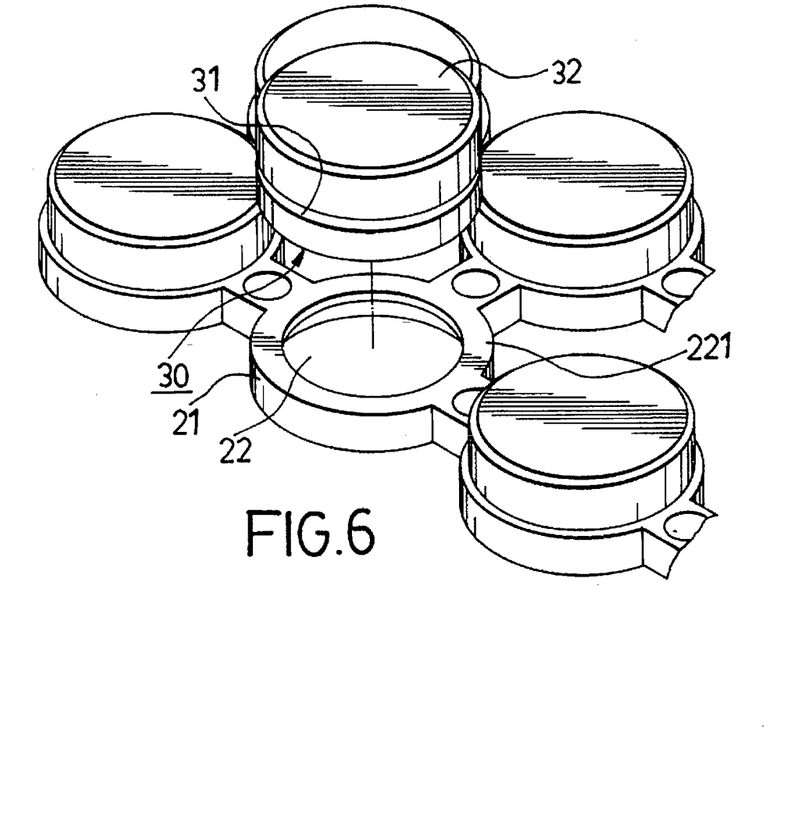
FIG. 6 is an exploded view illustrating how a cylindrical cooling stub is mounted on the retaining member.
Figure 7:
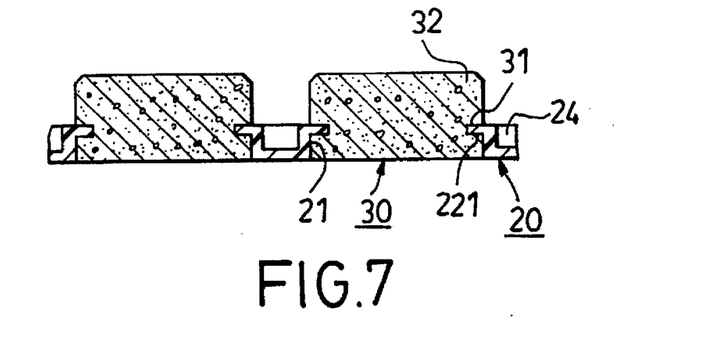
FIG. 7 is a sectional view showing the assembly of the retaining member and the cylindrical cooling stubs.

Referring to FIGS. 4, 5 and 6, each of the cylindrical cooling stubs 30 has a peripheral wall which is formed with an annular groove 31 that engages the flange 221 in a respective one of the positioning holes 22 such that a lower end portion of the stub 30 is received fittingly in the respective one of the positioning holes 22. As best shown in FIG. 7, each of the stubs 30 has an upper end portion 32 extending out of the corresponding positioning hole 22. It should be noted that the cooling stubs 30 are made of stone, such as marble, emerald, jade, gem, or the like.

Referring again to FIG. 2, the conduit unit 19 is embedded in the seat body 10 and has a main tube 14 with an air inlet extending out of the seat body 10. A plurality of conduit branches 191 extend from the main tube 14 and are communicated fluidly with the same. Each of the branches 191 is formed with a plurality of air outlets 192 which are communicated fluidly with the vent holes 111 of the seat body 10. A hollow tubular member 18 has a first open end connected to the air inlet of the main tube 14 of the conduit unit 19. The tubular member 18 has an annular peripheral wall, two opposed positioning tabs 181 which extend radially and outwardly from the peripheral wall of the tubular member 18 and which are secured to the seat body 10 by sewing, and a circumferentially extending slot 182 formed in the peripheral wall between the tabs 181.

Figure 8:
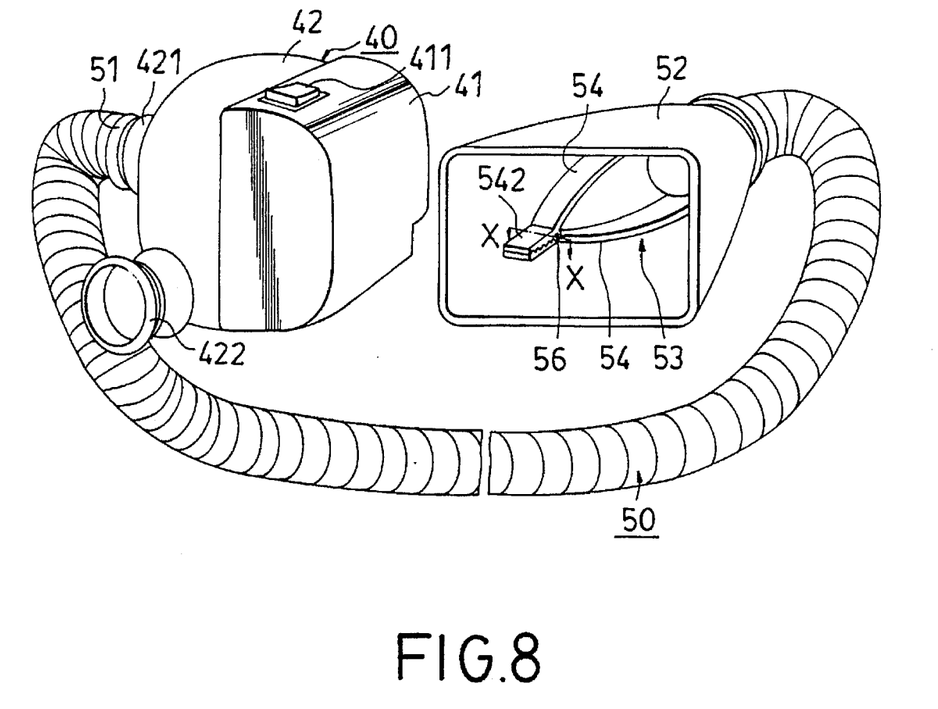
FIG. 8 is a perspective view illustrating the exhaust fan unit of the cushion according to the first embodiment of the present invention.
Figure 9:
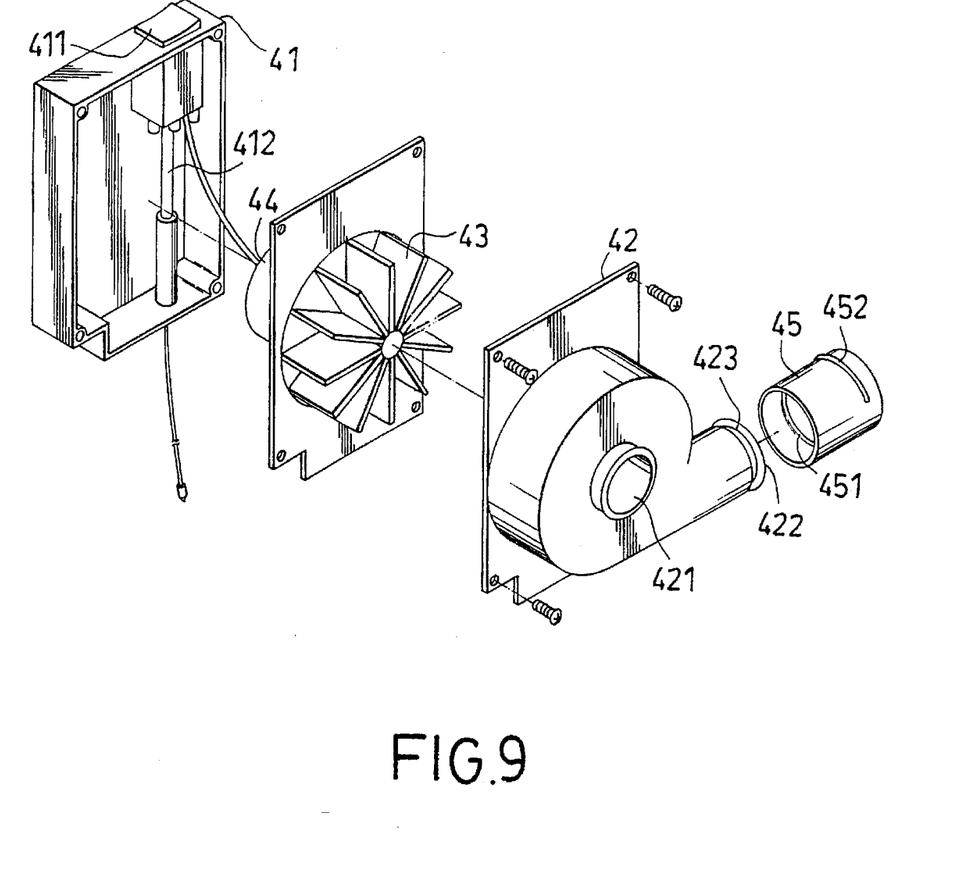
FIG. 9 is a partly exploded view of a portion of the exhaust fan unit shown in FIG. 8.

Referring to FIGS. 1, 8 and 9, the exhaust fan unit 40 includes a first housing half 41, a second housing half 42 which complements and which is connected to the first housing half 41, a fan blade unit 43 installed operably in the assembly of the first and second housing halves, 41 and 42, and a flexible tube assembly 50. A driving motor 44 is connected to a power source (not shown) via a cable 412 and a switch unit 411 so as to be powered by the power source in order to drive the fan blade unit 43 when the switch unit 411 is operated.

Figure 10:
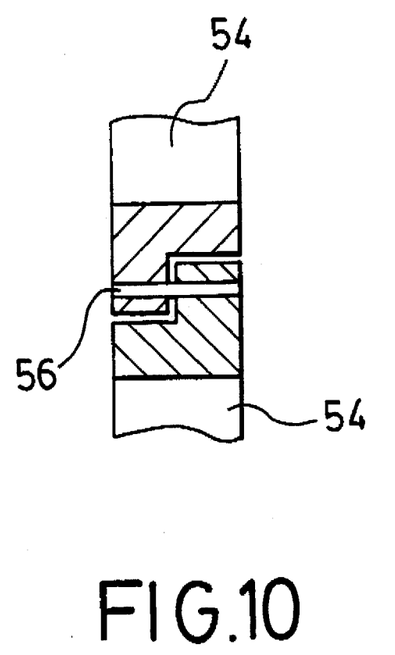
FIG. 10 is a fragmentary, partly sectional view illustrating a portion of the exhaust fan unit, taken along line X—X in FIG. 8.
Figure 11:
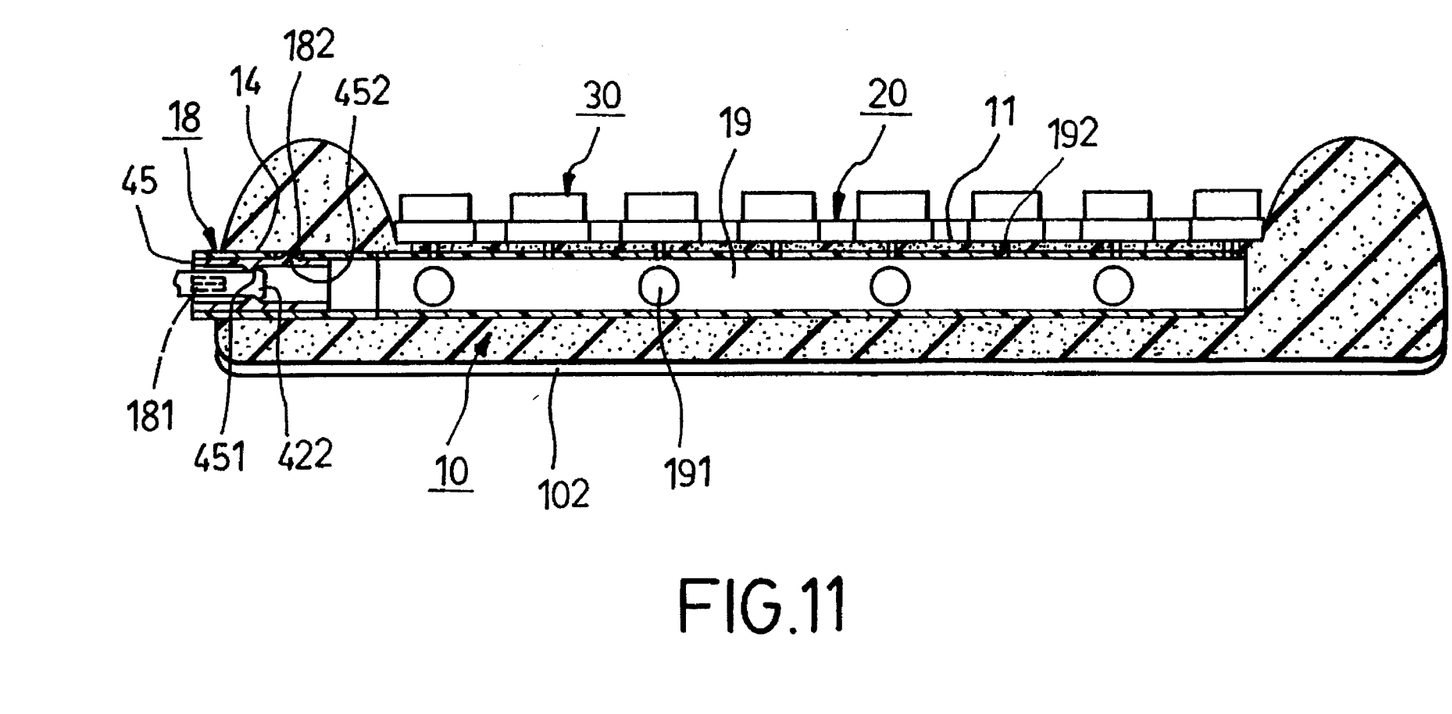
FIG. 11 is a partly sectional view illustrating the cushion according to the first embodiment of the present invention, the exhaust fan unit being removed from the drawing.

The second housing half 42 has an air inlet 421 and an air outlet 422. The air outlet 422 of the second housing half 42 has an annular periphery formed with a radially and outwardly extending flange 423. An annular hollow connector 45 is sleeved on the periphery of the air outlet 422 and has an inner wall formed with an annular groove 451 which engages the flange 423 on the periphery of the air outlet 422 so as to prevent disengagement of the connector 45 from the periphery of the air outlet 422 of the second housing half 42. As best shown in FIGS. 9 and 11, the connector 45 is inserted into the tubular member 18 of the seat body 10 and further has an outer wall which is formed with a circumferentially extending projection 452 that engages the circumferentially extending slot 182 in the tubular member 18 so as to prevent disengagement of the connector 45 from the tubular member 18. A flexible tube assembly 50 includes a flexible, tube 51 having a first end to which the air inlet 421 of the second housing half 42 of the fan unit 40 is connected and a second end to which a flexible mouth 52 is connected. A pair of pliers 53 is provided in the mouth 52. The pliers 53 have a pair of actuating arms 54 which are normally biased to pivot away from each other about a pivot pin 56, as shown in FIG. 10, and a pair of jaws 542 which are normally biased to pivot toward each other about the pivot pin 56. The jaws 542 pivot away from each other when the actuating arms 54 are pivoted toward each other so as to clamp something.

Referring once more to FIGS. 5 and 6, since the retaining member 20 is made of polyvinyl (PV) material, the retaining member 20 has an appropriate flexibility such that the stubs 30 may be easily pressed to engage the positioning holes 22.

Referring back to FIG. 2, since the retaining member 20 is retained in the depression of the seat body 10 by the inner periphery of the seat body 10, and since the lug 26 of the retaining member 20 is formed with the elongated throughhole 27, while the flat surface 15 of the seat body 10 is formed with the elongated slot 16 which is aligned with the through-hole 27 of the lug 26 of the retaining member 20, the user can grip the cushion of the present invention by extending his fingers (not shown) through the through-hole 27 and the slot 16. Therefore, the cushion of the present invention can be easily brought along by the user.

Referring to FIGS. 1, 8 and 11, when the cushion of the present invention is used in an automobile (partly shown), the driving motor 54 is connected electrically to the automobile battery via the switching unit 411. Since the mouth 52 is flexible, the actuating arms 54 of the pliers 53 may be pressed to pivot toward each other by the application of pressure on the mouth 52 so as to permit pivoting of the jaws 542 away from each other. Therefore, the second end of the flexible tube 51 may be connected to an air conditioner 57 of the automobile by clipping the jaws 542 on slats 571 at an output side of the air conditioner 57. Thus, operation of the switching unit 411 enables the driving motor 44 to drive rotatably the fan blade unit 43 so as to draw cool air from the air conditioner 57 into the branches 191 via the flexible tube 51 and the main tube 14 of the conduit unit 19. The cool air flowing through the branches 191 flows out of the seat body 10 via the air outlets 192 of the branches 191 and the vent holes 111 of the seat body 10 and rapidly diffuses to cool the cooling stubs 30 on the retaining member 20 so that the cushion may be used comfortably by a user for a long period of time.

In addition, since the cushion of the present invention is portable, the cushion can be used in any place which has a cooling source. Moreover, the retaining member 20 is detachable from the seat body 10 so that the seat body 10 can be replaced with a new one when the original seat body 10 is worn.

Figure 12:
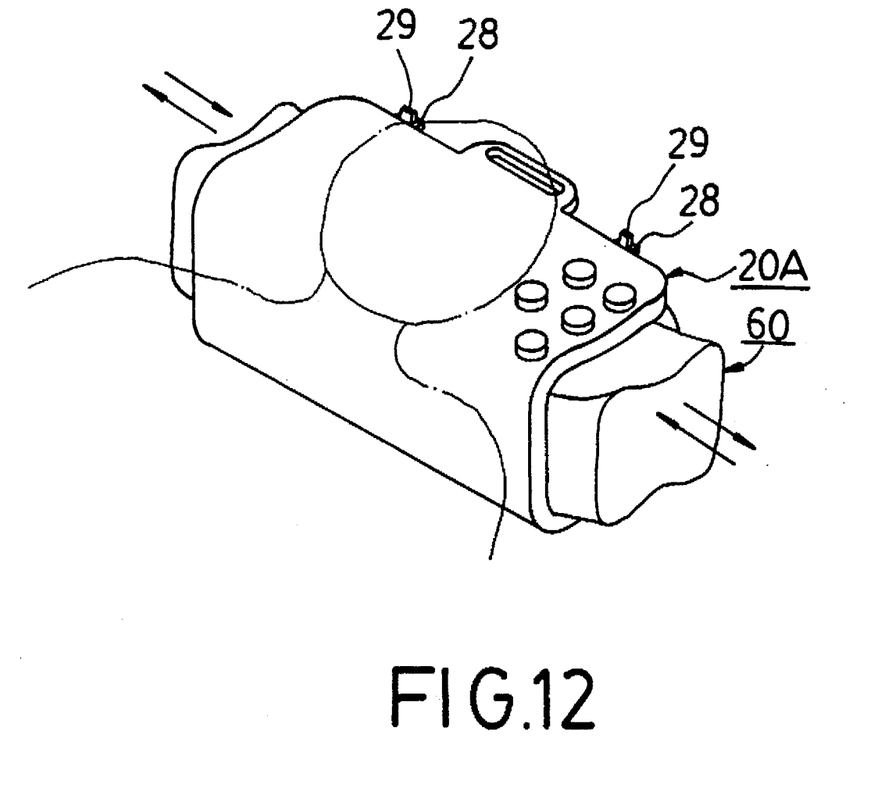
FIG. 12 is a perspective view of a cushion according to a second embodiment of the present invention.
Figure 13:
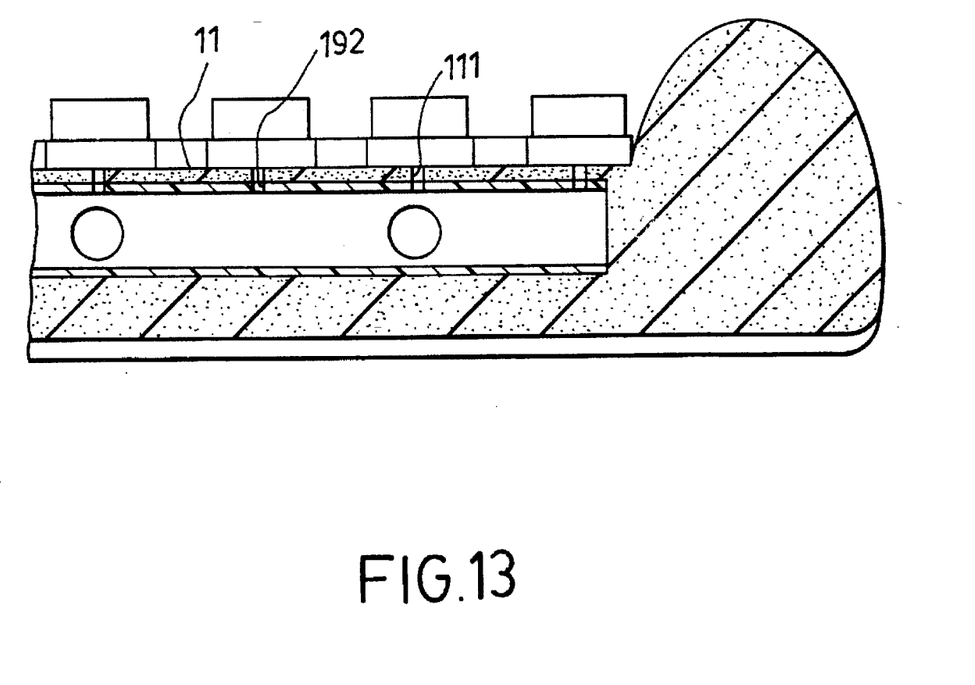
FIG. 13 is an enlarged partial view of FIG. 11 showing the vent holes and air outlets.

Referring now to FIG. 12, a second embodiment of the present invention is shown. In the present embodiment, the retaining member 20A is provided with a pair of locking holes 28 on one end thereof and a pair of hook means 29 on an opposite end. The hook means 29 engage the locking holes 28 of the retaining member 20A when the retaining member 20A is wrapped around a foam member 60 which is shaped as a pillow. An electrically operated motor (not shown) is embedded in the foam member 60 and is operable so as to result in reciprocal movement of the foam member 60 and the retaining member 20A in the directions indicated by the arrows, thereby providing a massaging effect on the head portion of the user (partly shown in phantom lines) when the user lays his head on the retaining member 20A. FIG. 13 shows in an enlarged manner the air outlets 192 that are represented in FIG. 11.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A cushion, comprising:
   a resilient seat body having an upper surface formed with a central depression and an inner periphery which defines said central depression;
   a retaining member disposed on said upper surface of said seat body in said depression and retained therein by said inner periphery of said seat body, said retaining member being made of a flexible material and being formed with an array of positioning holes;

a plurality of cylindrical cooling stubs made of stone, each of which having a lower portion fittingly received in a respective one of said positioning holes; and a conduit unit, embedded in said seat body, said conduit unit permitting passage of a cooling medium therein and cooling of said cylindrical cooling stubs.

2. A cushion as claimed in claim 1, wherein each of said positioning holes is defined by an annular wall having an upper end portion formed with an inwardly extending flange, each of said cooling stubs having a peripheral wall which is formed with an annular groove that engages said flange in a respective one of said positioning holes.

3. A cushion as claimed in claim 1, wherein said upper surface of said seat body is formed with a plurality of vent holes in said depression, said conduit unit having an air inlet extending out of said seat body and a plurality of air outlets that are fluidicly communicated with said vent holes, said cushion including an exhaust fan unit which has an air outlet connected to said air inlet of said conduit unit of said seat body and an air inlet adapted to be connected to a cool air source, wherein said fan unit draws cool air from said cool air source and into said conduit unit.

4. A cushion as claimed in claim 1, wherein said seat body further has an edge with a central section that has a flat surface which is flush with a bottom of said depression and which is formed with an elongated slot, said retaining member having a lug which extends outwardly therefrom and over said flat surface, said lug being formed with an elongated through-hole which is aligned with said elongated slot.

\* \* \* \* \*